United States Patent
Lee et al.

(10) Patent No.: US 10,735,942 B2
(45) Date of Patent: Aug. 4, 2020

(54) METHOD AND APPARATUS FOR PERFORMING THE TRACE CORRESPONDING TO A TERMINAL IN WIRELESS COMMUNICATION SYSTEM

(71) Applicant: Samsung Electronics Co., Ltd., Suwon-si, Gyeonggi-do (KR)

(72) Inventors: Chungkeun Lee, Seoul (KR); Hwajin Cha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/070,990

(22) PCT Filed: Jan. 25, 2017

(86) PCT No.: PCT/KR2017/000894
§ 371 (c)(1),
(2) Date: Jul. 18, 2018

(87) PCT Pub. No.: WO2017/131442
PCT Pub. Date: Aug. 3, 2017

(65) Prior Publication Data
US 2019/0028879 A1    Jan. 24, 2019

(30) Foreign Application Priority Data
Jan. 25, 2016 (KR) .................. 10-2016-0008611

(51) Int. Cl.
*H04W 8/08* (2009.01)
*H04W 24/10* (2009.01)
(Continued)

(52) U.S. Cl.
CPC .............. *H04W 8/08* (2013.01); *H04W 4/02* (2013.01); *H04W 24/10* (2013.01);
(Continued)

(58) Field of Classification Search
None
See application file for complete search history.

(56) References Cited

U.S. PATENT DOCUMENTS

2006/0058056 A1* 3/2006 Das .................. H04W 36/30
455/524
2009/0129341 A1* 5/2009 Balasubramanian ......................
H04W 36/0055
370/331

(Continued)

FOREIGN PATENT DOCUMENTS

CN      102378282 A    3/2012
CN      103533646 A    1/2014
(Continued)

OTHER PUBLICATIONS

ISA/KR, "International Search Report and Written Opinion of the International Searching Authority," International Application No. PCT/KR2017/000894, dated Apr. 25, 2017, 10 pages.
(Continued)

*Primary Examiner* — Anh Vu H Ly

(57) ABSTRACT

A method and apparatus for performing a terminal trace in a wireless communication system is disclosed. A control method for a femto base station according to an embodiment of the present invention may comprise the steps of: after a terminal is handed over to the femto base station, receiving terminal trace activation information from a serving base station; and transmitting a message including the received terminal trace activation information to a femto gateway (HeNB gateway) so as to allow the femto gateway to trace the terminal.

9 Claims, 8 Drawing Sheets

(51) Int. Cl.
*H04W 36/00* (2009.01)
*H04W 84/04* (2009.01)
*H04W 4/02* (2018.01)
*H04W 64/00* (2009.01)

(52) U.S. Cl.
CPC ....... *H04W 36/0055* (2013.01); *H04W 64/00* (2013.01); *H04W 84/045* (2013.01)

(56) References Cited

U.S. PATENT DOCUMENTS

| | | | |
|---|---|---|---|
| 2010/0075635 A1 | 3/2010 | Lim et al. | |
| 2010/0227627 A1* | 9/2010 | Ishii | H04W 8/06 455/456.2 |
| 2011/0019644 A1 | 1/2011 | Cheon et al. | |
| 2011/0045823 A1 | 2/2011 | Wang et al. | |
| 2011/0170517 A1* | 7/2011 | Bakker | H04W 36/0033 370/331 |
| 2011/0171953 A1* | 7/2011 | Faccin | H04W 48/08 455/426.1 |
| 2011/0183675 A1 | 7/2011 | Bae et al. | |
| 2011/0319115 A1* | 12/2011 | Racz | H04W 24/10 455/514 |
| 2012/0307795 A1 | 12/2012 | Takahashi et al. | |
| 2013/0044730 A1 | 2/2013 | Qian et al. | |
| 2013/0083773 A1* | 4/2013 | Watfa | H04W 36/0033 370/331 |
| 2013/0122909 A1* | 5/2013 | Takahashi | H04W 24/00 455/436 |
| 2013/0237233 A1* | 9/2013 | Radulescu | H04W 36/22 455/440 |
| 2013/0329450 A1* | 12/2013 | Degner | G06F 1/1616 362/602 |
| 2014/0079026 A1* | 3/2014 | Dimou | H04W 36/04 370/332 |
| 2014/0113656 A1* | 4/2014 | Schmidt | H04W 24/10 455/456.2 |
| 2014/0128057 A1* | 5/2014 | Siomina | H04J 3/0685 455/423 |
| 2014/0228016 A1* | 8/2014 | Futaki | H04W 36/0055 455/422.1 |
| 2014/0295847 A1* | 10/2014 | Futaki | H04W 36/0083 455/436 |
| 2014/0348129 A1* | 11/2014 | Yang | H04W 36/0016 370/331 |
| 2015/0327127 A1* | 11/2015 | Centonza | H04W 36/0055 455/436 |
| 2016/0044559 A1* | 2/2016 | Xu | H04W 36/0055 370/331 |
| 2016/0142944 A1* | 5/2016 | Cao | H04W 36/0022 370/328 |
| 2016/0353318 A1* | 12/2016 | Liu | H04L 41/00 370/328 |

FOREIGN PATENT DOCUMENTS

| | | |
|---|---|---|
| CN | 103889023 A | 6/2014 |
| KR | 10-1565619 B1 | 11/2015 |
| WO | 2010-035995 A2 | 4/2010 |

OTHER PUBLICATIONS

3GPP TS 36.423 V13.2.0 (Dec. 2015), Technical Specification, 3rd Generation Partnership Project; Technical Specification Group Radio Access Network; Evolved Universal Terrestrial Radio Access Network (E-UTRAN); X2 application protocol (X2AP) (Release 13), 232 pages.
3GPP TS 32422 V124.0 (Dec. 2014), Technical Specification, 3rd Generation Partnership Project; Technical Specification Group Services and System Aspects; Telecommunication management; Subscriber and equipment trace; Trace control and configuration management (Release 12), 142 pages.
European Patent Office, "Supplementary Partial European Search Report," Application No. EP 17744563.2, dated Oct. 1, 2018, 13 pages.
Alcatel-Lucent, et al., "Introduction to the X2GW," R3-132182, 3GPP TSG-RAN3 Meeting #83, San Francisco, USA, Nov. 11-15, 2013, 22 pages.
3GPP TS 36A13 V9.4.0 (Sep. 2010), Technical Specification, 3rd Generation Partnership Project; Technical Specification Group Radio Access Network; Evolved Universal Terrestrial Radio Access Network (E-UTRAN); S1 Application Protocol (S1AP) (Release 9), Sep. 2010, 241 pages.
Notification of the First Office Action in connection with Chinese Application No. 201780008036.6 dated Mar. 16, 2020, 19 pages.
Alcatel-Lucent, et al., "Introduction of the X2GW," Change Request, R3-132182, 3GPP TSG-RAN3 Meeting #82, San Francisco, USA, Nov. 11-15, 2013, 22 pages.
3GPP TS 32.422 V13.0.0 (Jun. 2015), Technical Specification, 3rd Generation Partnership Project; Technical Specification Group Services and System Aspects; Telecommunication management; Subscriber and equipment trace; Trace control and configuration management (Release 13), Jun. 2015, 151 pages.
3GPP TS 36.423 V13.5.0 (Sep. 2016), Technical Specification, 3rd Generation Partnership Project; Technical Specification Group Radio Access Network; Evolved Universal Terrestrial Radio Access Network (E-UTRAN); X2 application protocol (X2AP) (Release 13), Sep. 2016, 238 pages.

* cited by examiner

METHOD AND APPARATUS FOR PERFORMING THE TRACE CORRESPONDING TO A TERMINAL IN WIRELESS COMMUNICATION SYSTEM

CROSS-REFERENCE TO RELATED APPLICATIONS AND CLAIM OF PRIORITY

This application is a 371 National Stage of International Application No. PCT/KR2017/000894 filed Jan. 25, 2017, which claims priority to Korean Patent Application No. KR 10-2016-0008611 filed on Jan. 25, 2016, the disclosures of which are herein incorporated by reference in their entirety.

BACKGROUND

1. Field

The present invention relates to a wireless communication system and, more particularly, to a method and apparatus for continuously tracking a specific terminal even when the terminal performs handover.

2. Description of Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

To meet this demand, the 3rd generation partnership project (3GPP) has been working to standardize specifications for the long term evolution (LTE) system as a next generation mobile communication system. The LTE system aims to realize high-speed packet based communication supporting a data rate of about 100 Mbps in the 2010s. To this end, various approaches have been considered, such as reducing the number of nodes on a communication path through simplification of the network architecture and bringing wireless protocols as close as possible to wireless channels.

Meanwhile, in a mobile communication system, a handover technique is used to enable seamless services between base stations so that a subscriber can freely use a mobile communication service even on the move.

In the mobile communication system, a technique of tracing or tracking a specific terminal can be used. For example, the base station to which the terminal is attached or the gateway connected to the base station can collect information on signals transmitted and received by the terminal to measure the quality of a mobile communication service.

However, when the terminal to be traced performs handover, if information for tracing is not delivered, tracing of the terminal may be interrupted.

SUMMARY

The present invention has been made in view of the above problem. Accordingly, an aspect of the present invention is to provide a method and apparatus for continuously tracing a specific terminal even when the terminal performs handover.

In accordance with an aspect of the present invention, there is provided a control method for a femto base station (HeNB). The control method may include: receiving terminal trace activation information from a serving base station if a terminal performs handover to the femto base station; and transmitting a message including the received terminal trace activation information to a femto gateway (HeNB gateway), causing the femto gateway to trace the terminal.

In accordance with another aspect of the present invention, there is provided a femto base station (HeNB). The HeNB may include: a transceiver configured to transmit and receive a signal; and a controller configured to control the transceiver to receive terminal trace activation information from a serving base station after a terminal performs handover to the femto base station, and control the transceiver to transmit a message including the received terminal trace activation information to a femto gateway (HeNB gateway), causing the femto gateway to trace the terminal.

In accordance with another aspect of the present invention, there is provided a control method for a mobility management entity (MME). The control method may include: tracing a specific terminal; receiving a message including terminal trace activation information from a femto gateway (HeNB gateway) after the terminal completes handover to a femto base station; and ignoring the received terminal trace activation information.

In accordance with another aspect of the present invention, there is provided a mobility management entity (MME). The MME may include a transceiver configured to transmit and receive a signal; and a controller configured to trace a specific terminal, control the transceiver to receive a message including terminal trace activation information from a femto gateway (HeNB gateway) after the terminal completes handover to a femto base station, and control ignoring the received terminal trace activation information.

In a feature of the present invention, it is possible to continuously trace a specific terminal even when the terminal performs handover between base stations connected to different gateways.

DETAILED DESCRIPTION

Figure 1A:
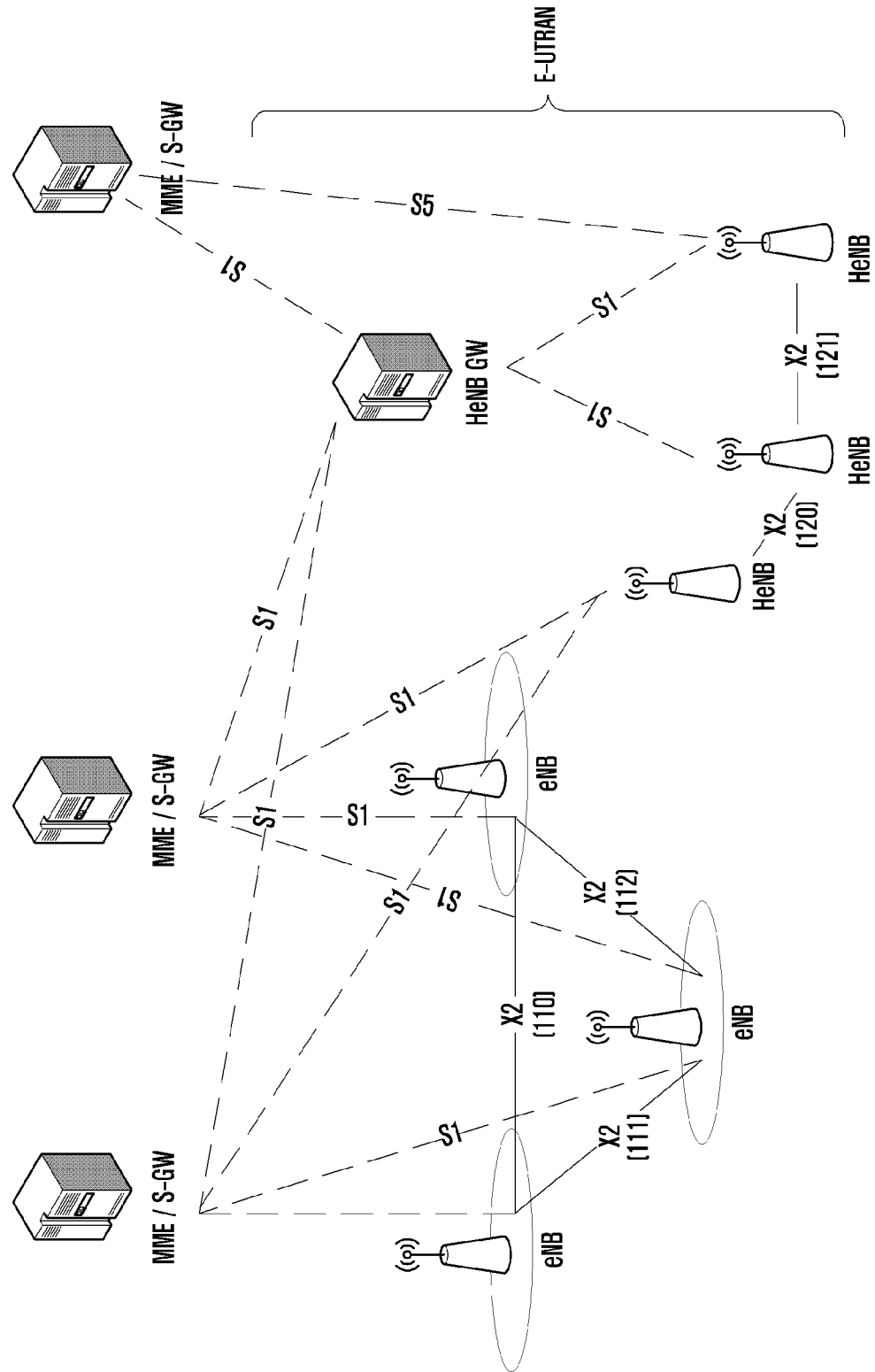
FIGS. 1A and 1B show a simplified depiction of X2 handover.

Hereinafter, embodiments of the present invention are described in detail with reference to the accompanying drawings. The same or similar reference symbols are used throughout the drawings to refer to the same or like parts. Descriptions of well-known functions and structures incorporated herein may be omitted to avoid obscuring the subject matter of the present invention.

The following description of embodiments is focused on the advanced E-UTRA (or LTE-A) system supporting carrier aggregation. However, it should be understood by those skilled in the art that the subject matter of the present invention is applicable to other communication systems having similar technical backgrounds and channel configurations without significant modifications departing from the scope of the present invention. For example, the subject matter of the present invention is applicable to multicarrier HSPA systems supporting carrier aggregation.

Descriptions of functions and structures well known in the art and not directly related to the present invention may also be omitted for clarity and conciseness without obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The aspects, features and advantages of the present invention will be more apparent from the following detailed description taken in conjunction with the accompanying drawings. The description of the various embodiments is to be construed as exemplary only and does not describe every possible instance of the present invention. It should be apparent to those skilled in the art that the following description of various embodiments of the present invention is provided for illustration purpose only and not for the purpose of limiting the present invention as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Figure 1B:
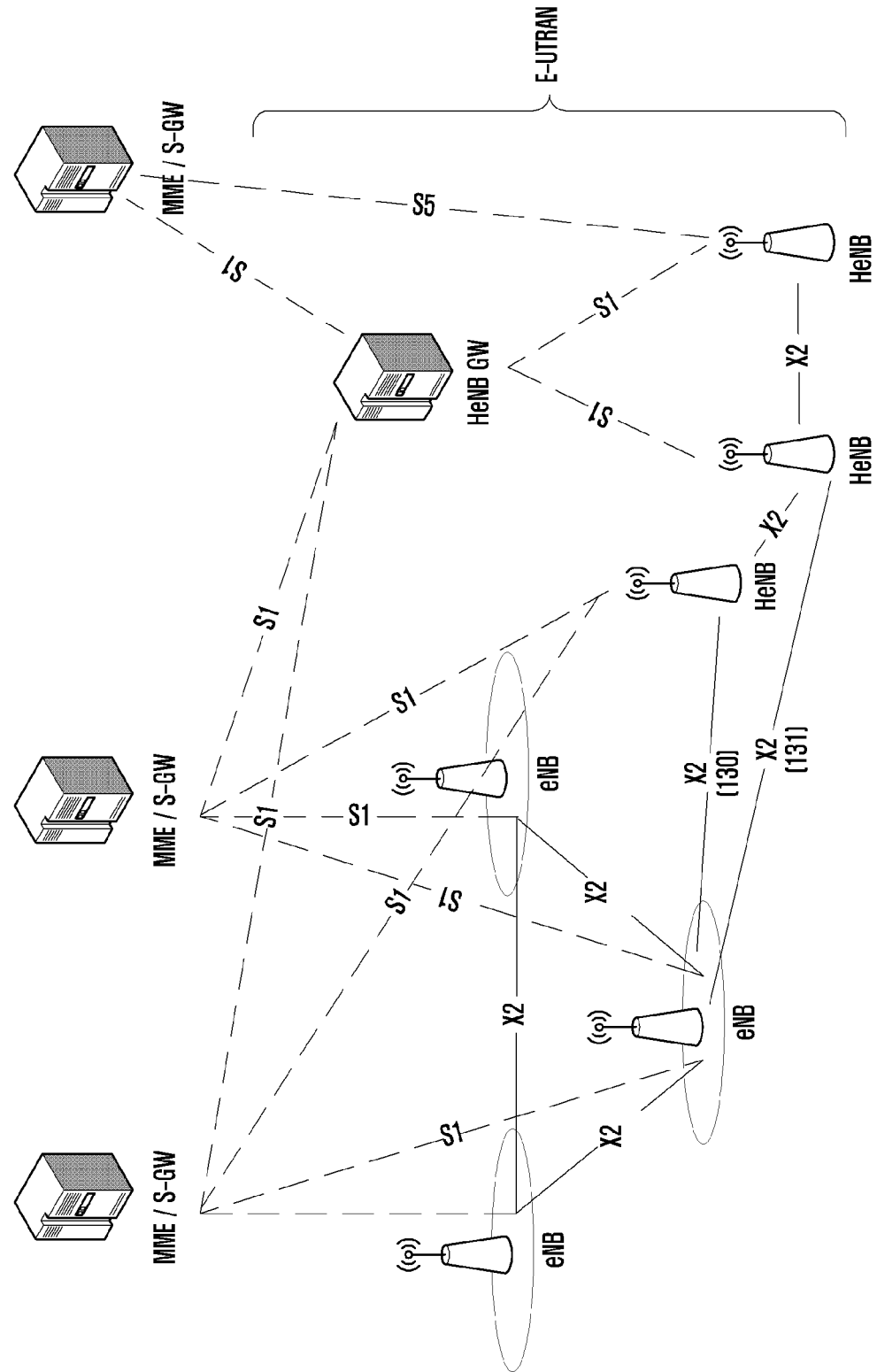

FIGS. 1A and 1B show a simplified depiction of X2 handover. In the 3GPP standard, a femto base station gateway (HeGW) has been introduced to prevent the load on the MME when a plurality of femto base stations (HeNBs) individually access the MME.

In addition to X2 handover between HeNBs in the same HeGW, 3GPP standard release 10 and beyond specifies X2 handover between HeNBs directly connected to a macro base station (eNB) or the MME. Accordingly, the network architecture has been extended to support the X2 handover operation between HeNBs connected to different HeGWs. 3GPP standard release 10 and beyond also allows X2 handover between different HeGWs.

Specifically, as shown in FIG. 1A, the base stations belonging to the same MME or serving gateway (S-GW) can be directly connected via the X2 interface 110, 111 or 112. Hence, the terminal is allowed to perform X2 handover between these base stations (110, 111 and 112).

In addition, since femto base stations (HeNBs) are directly connected via the X2 interface 120 or 121, the terminal is allowed to perform X2 handover between these HeNBs (120 and 121).

Meanwhile, in 3GPP standard release 11 and beyond, the X2 interface has been extended up to between the HeNB and the macro eNB. Hence, the entities involved in X2 handover have increased.

For example, as shown in FIG. 1B, the X2 interface 130 or 131 is extended up to between the macro base station (eNB) and the femto base station (HeNB). Hence, the terminal may perform X2 handover from the macro base station to the femto base station or from the femto base station to the macro base station.

Figure 2:
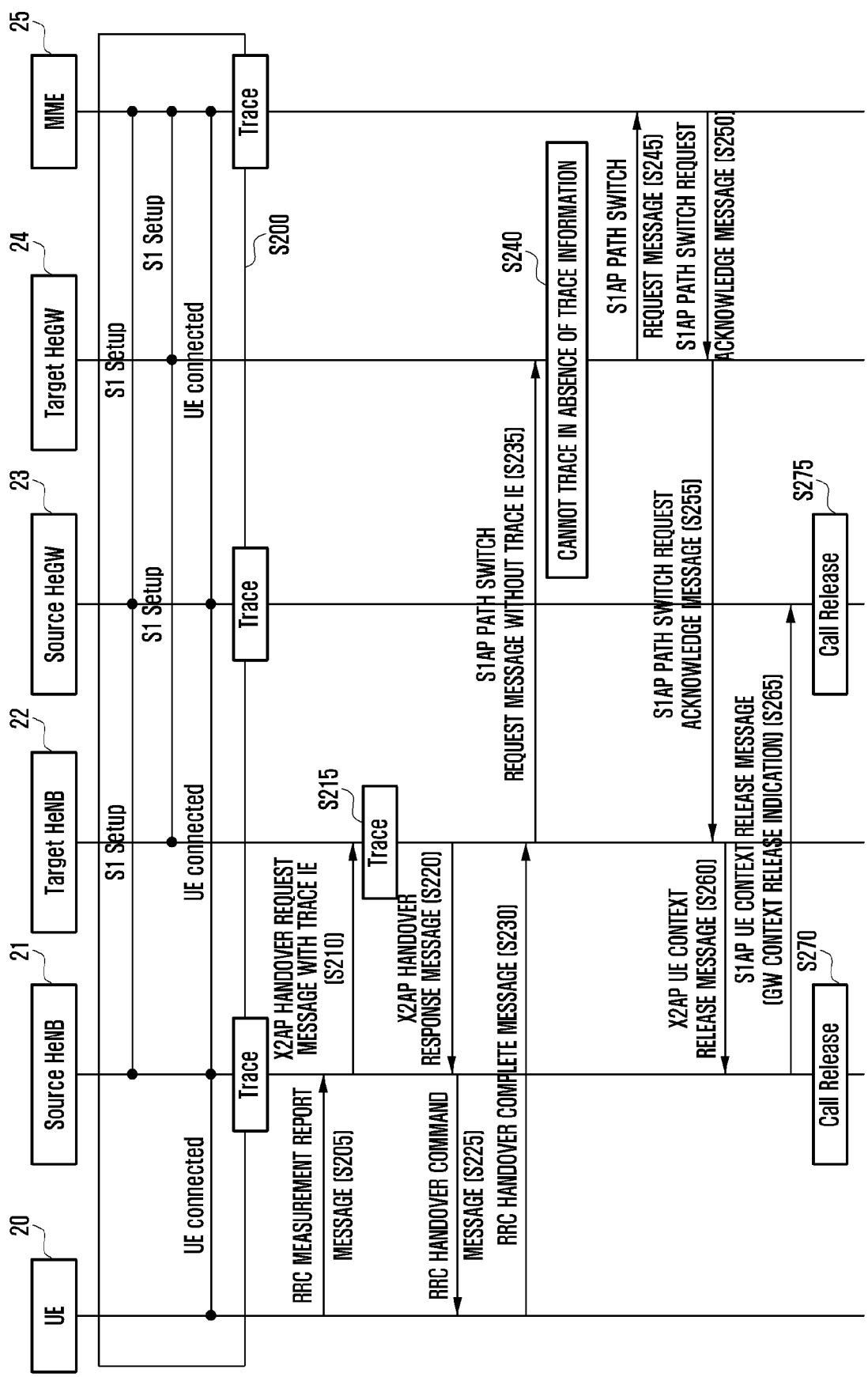
FIG. 2 is a sequence diagram illustrating a regular handover process of a terminal to be traced.

Next, a description is given of a general process for performing X2 handover between femto base stations (HeNBs) connected to different HeGWs with reference to FIG. 2.

The source HeNB 21 may indicate a HeNB to which the terminal (UE) 20 is currently connected, and the target HeNB 22 may indicate a base station to which the terminal 20 is to be handed over.

At step S200, the source HeNB 21 may be connected to the MME 25 via the source HeGW 23. The target HeNB 22 may be connected to the MME 25 via the target HeGW 24. It is assumed that the source HeGW 23 and the target HeGW 24 are different gateways.

The terminal 20 is connected to the source HeNB 21 and may be connected to the MME 25 via the source HeGW 23.

The MME 25 may determine the terminal 20 as a target to be traced. When the MME 25 determines that the terminal 20 is to be traced, the source HeNB 21 and the source HeGW 23 connected with the terminal 20 can receive information indicating that the terminal 20 is a trace target from the MME 25. Thus, the source HeNB 21 and the source HeGW 23 may trace the terminal 20.

Thereafter, the terminal 20 can perform X2 handover from the source HeNB 21 to the target HeNB 22 through steps S205 to S275.

At step S205, the terminal 20 may transmit an RRC measurement report message to the source HeNB 21.

Specifically, the terminal 20 may receive a message including information on the events triggering reporting of the received signal strength (e.g., measurement configuration information) from the source HeNB 21. For example, the terminal 20 may receive such information through an RRC connection reconfiguration message before step S205.

Upon receiving the RRC connection reconfiguration message, the terminal 20 can measure the strength of signals received from the serving cell and neighbor cells. When the indicated event occurs, the terminal 20 may report information on the measured signal strengths to the source HeNB 21. For example, the terminal 20 may report information on the measured signal strength on a periodic basis or when a specific condition set by the source HeNB 21 is satisfied.

At step S210, upon determining to handover the terminal to the target HeNB 22 based on the measured signal strengths, the source HeNB 21 may transmit an X2AP handover request message to the target HeNB 22. Here, the source HeNB 21 may include trace activation information in the X2AP handover request message. The trace activation information may be a trace activation IE or a trace IE.

At step S215, the target HeNB 22 may trace the terminal 20 according to the received trace activation information. For example, the target HeNB 22 may examine all the signals transmitted and received by the terminal 20, and may transmit information on the transmitted and received signals to a trace collection entity (TCE).

At step S220, the target HeNB 22 may transmit an X2AP handover response message to the source HeNB 21 in return to the received X2AP handover request message.

Upon receiving the X2AP handover response message, at step S225, the source HeNB 21 may transmit an RRC handover command message to the terminal 20. For example, the source HeNB 21 may request the terminal 20 to connect to the target HeNB 22 by sending an RRC connection reconfiguration message.

At step S230, the terminal 20 may transmit an RRC handover complete message to the target HeNB 22.

Upon receiving the RRC handover complete message, at step S235, the target HeNB 22 may transmit a S1AP path switch request message to the target HeGW 24 to which the target HeNB 22 is connected.

For example, the target HeNB 22 may confirm that it is successfully connected with the terminal 20, and may notify the target HeGW 24 that the terminal 20 has successfully connected to the target HeNB 22 by sending the S1AP path switch request message.

At step S245, the target HeGW 24 may forward the received S1AP path switch request message to the MME 25. Here, the target HeGW 24 may notify the MME 25 that the terminal 20 has successfully connected to the target HeNB 22 by forwarding the S1AP path switch request message.

At step S250, the target HeGW 24 may receive a S1AP path switch request acknowledge message from the MME 25.

At step S255, the target HeGW 24 may forward the S1AP path switch request acknowledge message received from the MME 25 to the target HeNB 22.

Thereafter, at step S260, the target HeNB 22 may send an X2AP UE context release message to the source HeNB 21. Here, the target HeNB 22 may notify the source HeNB 21 that X2 handover has been successfully completed by transmitting the X2AP UE context release message.

At step S265, the source HeNB 21 transmits an S1AP UE context release request message to the source HeGW 23.

Thereafter, the source HeNB 21 and the source HeGW 23 may release the connection with the terminal 20 at step S270 and step S275, respectively.

Meanwhile, at step S235, the target HeGW 24 receives the S1AP path switch request message without trace activation information such as a trace activation IE or trace IE from the target HeNB 22.

Hence, at step S240, the target HeNB 22 cannot trace the terminal 20 because it has not received the trace activation information.

As a result, it may be not possible to collect trace information for the terminal 20 between the target HeNB 22 and the target HeGW 24 or between the target HeGW 24 and the MME 25.

Figure 3:
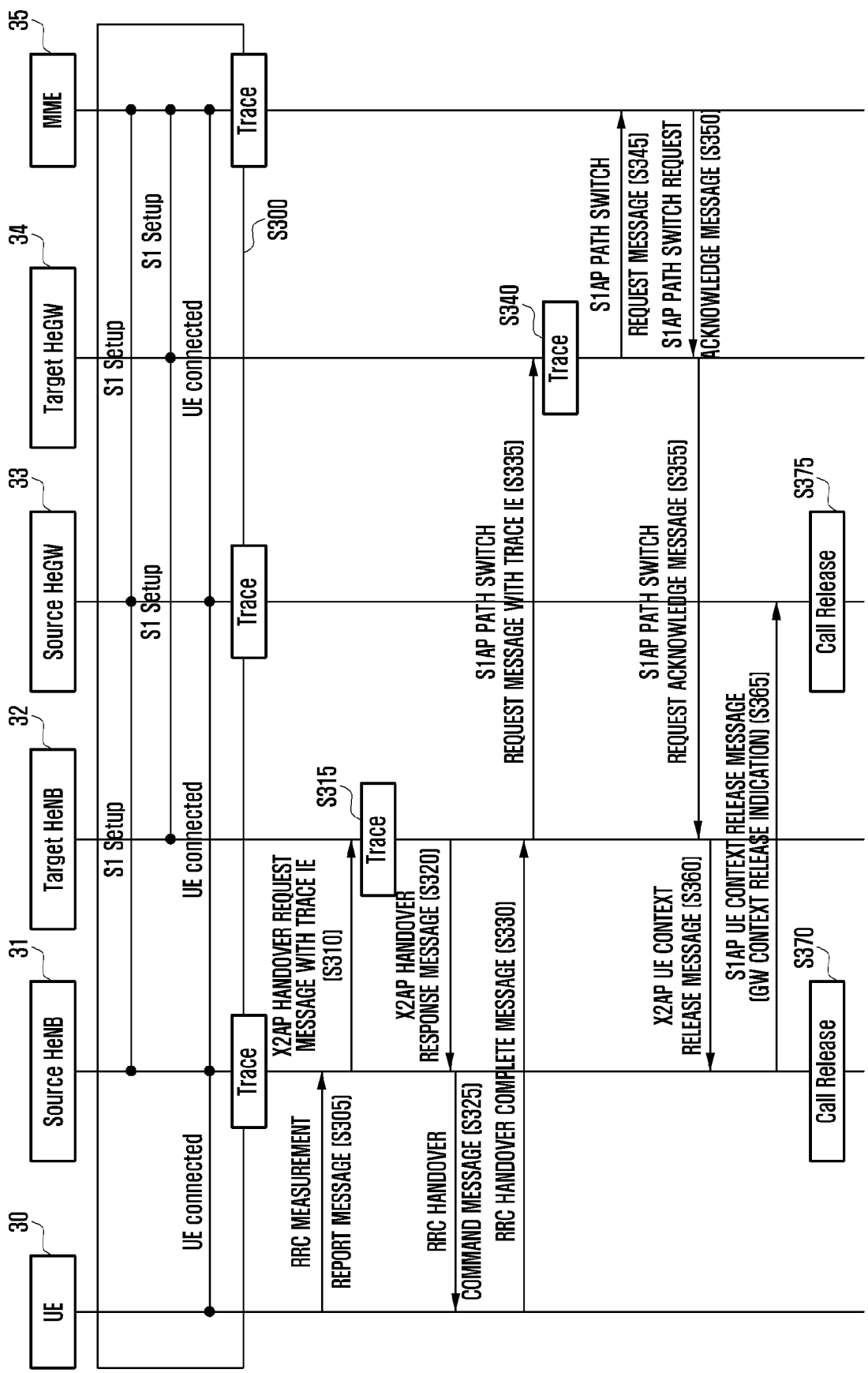
FIG. 3 is a sequence diagram illustrating a process for a terminal to be traced to perform handover according to an embodiment of the present invention.

To solve the above problem, FIG. 3 is a sequence diagram illustrating a process for performing X2 handover according to an embodiment of the present invention.

At step S300, the source HeNB 31 may be connected to the MME 35 via the source HeGW 33. The target HeNB 32 may be connected to the MME 35 via the target HeGW 34. It is assumed that the source HeGW 33 and the target HeGW 34 are different gateways.

The terminal 30 is connected to the source HeNB 31 and may be connected to the MME 35 via the source HeGW 33.

The MME 35 may determine the terminal 30 as a target to be traced. When the MME 35 determines that the terminal 30 is to be traced, the source HeNB 31 and the source HeGW 33 connected with the terminal 30 can receive information indicating that the terminal 30 is a trace target from the MME 35. Thus, the source HeNB 31 and the source HeGW 33 may trace the terminal 30.

Thereafter, the terminal 30 can perform X2 handover from the source HeNB 31 to the target HeNB 32 through steps S305 to S375.

At step S305, the terminal 30 may transmit an RRC measurement report message to the source HeNB 31.

Specifically, the terminal 30 may receive a message including information on the events triggering reporting of the received signal strength (e.g., measurement configuration information) from the source HeNB 31. For example, the terminal 30 may receive such information through an RRC connection reconfiguration message before step S305.

Upon receiving the RRC connection reconfiguration message, the terminal 30 can measure the strength of signals received from the serving cell and neighbor cells. When the indicated event occurs, the terminal 30 may report information on the measured signal strengths to the source HeNB 31. For example, the terminal 30 may report information on the measured signal strength on a periodic basis or when a specific condition set by the source HeNB 31 is satisfied.

At step S310, upon determining to handover the terminal to the target HeNB 32 based on the measured signal strengths, the source HeNB 31 may transmit an X2AP handover request message to the target HeNB 32. Here, the source HeNB 31 may include trace activation information in the X2AP handover request message. The trace activation information may be a "trace activation" IE or a "trace" IE.

At step S315, the target HeNB 32 may trace the terminal 30 according to the received trace activation information. For example, the target HeNB 32 may examine all the signals transmitted and received by the terminal 30, and may transmit information on the transmitted and received signals to a trace collection entity (TCE).

At step S320, the target HeNB 32 may transmit an X2AP handover response message to the source HeNB 31 in return to the received X2AP handover request message.

Upon receiving the X2AP handover response message, at step S325, the source HeNB 31 may transmit an RRC handover command message to the terminal 30. For example, the source HeNB 31 may request the terminal 30 to connect to the target HeNB 32 by sending an RRC connection reconfiguration message.

At step S330, the terminal 30 may transmit an RRC handover complete message to the target HeNB 32.

Upon receiving the RRC handover complete message, at step S335, the target HeNB 32 may transmit a S1AP path switch request message to the target HeGW 34 to which the target HeNB 32 is connected.

For example, the target HeNB 32 may confirm that it is successfully connected with the terminal 30, and may notify the target HeGW 34 that the terminal 30 has successfully connected to the target HeNB 32 by sending the S1AP path switch request message.

At this time, the target HeNB 32 may transmit the trace activation information to the target HeGW 34. For example, the trace activation information is information that causes the target HeGW 34 to trace the terminal 30, and may be a trace activation IE or a trace IE.

The target HeNB 32 may transmit the S1AP path switch request message including the trace activation information. Alternatively, the target HeNB 32 may separately transmit the trace activation information to the target HeGW 34.

Upon receiving the trace activation information, at step S340, the target HeGW 34 can trace the terminal 30. As such, it is possible to continuously trace the terminal 30 even when the terminal 30 performs X2 handover to a target HeNB connected to another target HeGW.

At step S345, the target HeGW 34 may forward the received S1AP path switch request message to the MME 35. Here, the target HeGW 34 may notify the MME 35 that the terminal 30 has successfully connected to the target HeNB 32 by forwarding the S1AP path switch request message.

Meanwhile, when the target HeGW 34 transmits the S1AP path switch request message with trace activation information to the MME 35, the MME 35 may ignore the trace activation information. For example, since the MME 35 has already traced the terminal 30, it may not need to perform a separate operation according to the received trace activation information. Hence, the MME 35 may skip an operation corresponding to the received trace activation information.

At step S350, the target HeGW 34 may receive a S1AP path switch request acknowledge message from the MME 35.

At step S355, the target HeGW 34 may forward the S1AP path switch request acknowledge message received from the MME 35 to the target HeNB 32.

Thereafter, at step S360, the target HeNB 32 may send an X2AP UE context release message to the source HeNB 31. Here, the target HeNB 32 may notify the source HeNB 31 that X2 handover has been successfully completed by transmitting the X2AP UE context release message.

At step S365, the source HeNB 31 transmits an S1AP UE context release request message to the source HeGW 33. Thereafter, the source HeNB 31 and the source HeGW 33 may release the connection with the terminal 30 at step S370 and step S375, respectively.

As described above, even when the terminal performs X2 handover between HeNBs connected to different HeGWs, as the target HeGW receives the trace activation information, it is possible to continuously trace the terminal.

Figure 4:
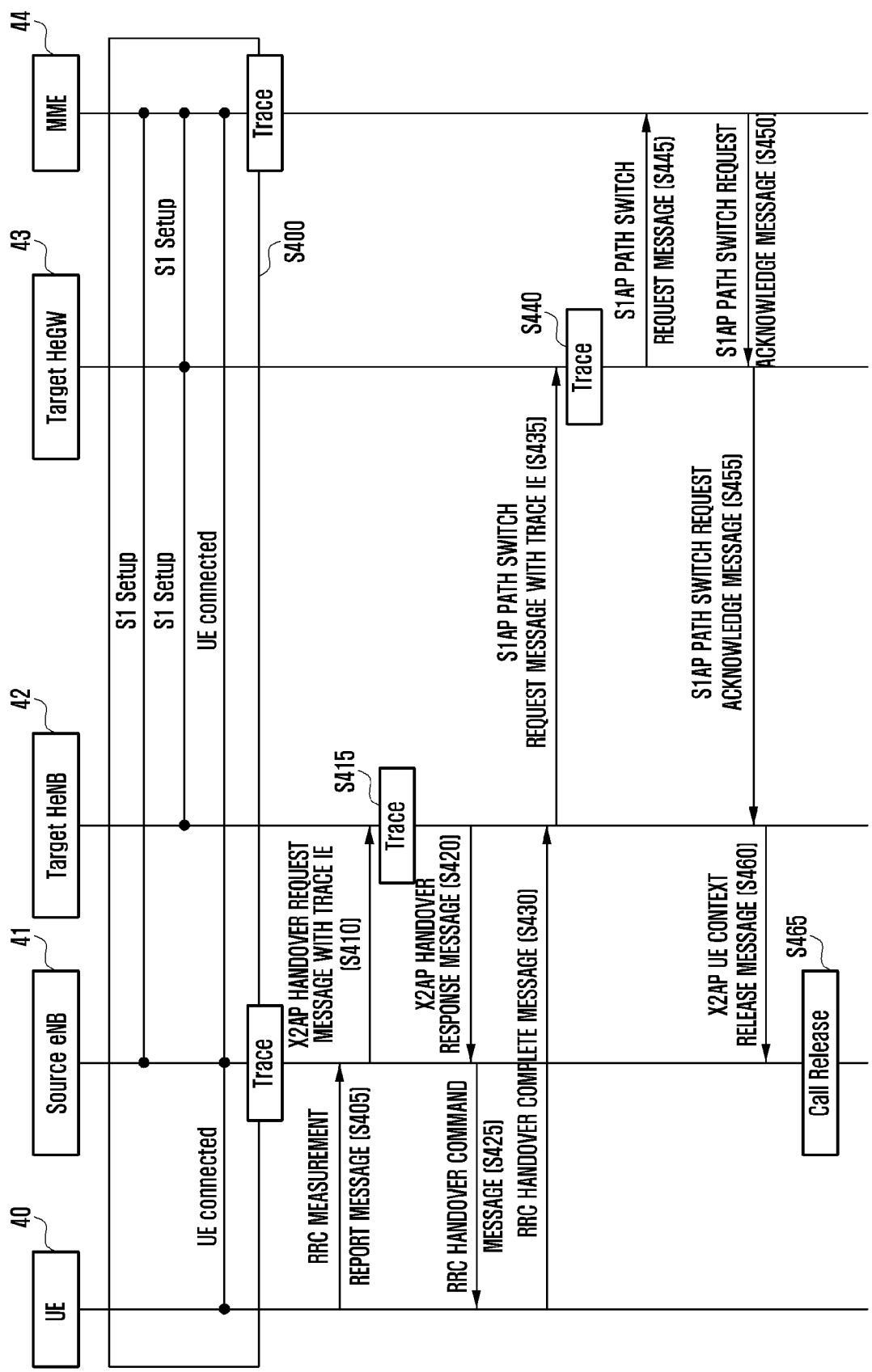
FIG. 4 is a sequence diagram illustrating a process for a terminal to be traced to perform handover from a macro base station to a femto base station according to another embodiment of the present invention.

FIG. 4 is a sequence diagram illustrating a process for a terminal to be traced to perform handover from a macro base station to a femto base station according to another embodiment of the present invention.

At step S400, the macro base station (eNB) 41 may be connected to the MME 35. For example, the eNB 41 may be connected to the MME 44 through the S1 interface.

The target HeNB 42 may be connected to the MME 44 via the target HeGW 43.

The terminal 40 may be connected to the eNB 41, and may be connected to the MME 44 via the eNB 41.

The MME 44 may determine the terminal 40 as a target to be traced. When the MME 44 determines that the terminal 40 is to be traced, the eNB 41 connected with the terminal 40 can receive information indicating that the terminal 40 is a trace target from the MME 44. Thus, the eNB 41 may trace the terminal 40.

Thereafter, the terminal 40 can perform X2 handover from the eNB 41 to the target HeNB 42 through steps S405 to S465.

At step S405, the terminal 40 may transmit an RRC measurement report message to the eNB 41.

Specifically, the terminal 40 may receive a message including information on the events triggering reporting of the received signal strength (e.g., measurement configuration information) from the eNB 41. For example, the terminal 40 may receive such information through an RRC connection reconfiguration message before step S405.

Upon receiving the RRC connection reconfiguration message, the terminal 40 can measure the strength of signals received from the serving cell and neighbor cells. When the indicated event occurs, the terminal 40 may report information on the measured signal strengths to the eNB 41. For example, the terminal 40 may report information on the measured signal strength on a periodic basis or when a specific condition set by the eNB 41 is satisfied.

At step S410, upon determining to handover the terminal to the target HeNB 42 based on the measured signal strengths, the eNB 41 may transmit an X2AP handover request message to the target HeNB 42. Here, the eNB 41 may include trace activation information in the X2AP handover request message. The trace activation information may be a trace activation IE or a trace IE.

At step S415, the target HeNB 42 may trace the terminal 40 according to the received trace activation information. For example, the target HeNB 42 may examine all the signals transmitted and received by the terminal 40, and may transmit information on the transmitted and received signals to a trace collection entity (TCE).

At step S420, the target HeNB 42 may transmit an X2AP handover response message to the eNB 41 in return to the received X2AP handover request message.

Upon receiving the X2AP handover response message, at step S425, the eNB 41 may transmit an RRC handover command message to the terminal 40. For example, the eNB 41 may request the terminal 40 to connect to the target HeNB 42 by sending an RRC connection reconfiguration message.

At step S430, the terminal 40 may transmit an RRC handover complete message to the target HeNB 42.

Upon receiving the RRC handover complete message, at step S435, the target HeNB 42 may transmit a S1AP path switch request message to the target HeGW 43 to which the target HeNB 42 is connected.

For example, the target HeNB 42 may confirm that it is successfully connected with the terminal 40, and may notify the target HeGW 43 that the terminal 40 has successfully connected to the target HeNB 42 by sending the S1AP path switch request message.

At this time, the target HeNB 42 may transmit the trace activation information to the target HeGW 43. For example, the trace activation information is information that causes the target HeGW 43 to trace the terminal 40, and may be a trace activation IE or a trace IE.

The target HeNB 42 may transmit the S1AP path switch request message including the trace activation information. Alternatively, the target HeNB 42 may separately transmit the trace activation information to the target HeGW 43.

Upon receiving the trace activation information, at step S440, the target HeGW 43 can trace the terminal 40. As such, it is possible to continuously trace the terminal 40 even when the terminal 40 performs X2 handover to a target HeNB connected to another target HeGW.

At step S445, the target HeGW 43 may forward the received S1AP path switch request message to the MME 44. Here, the target HeGW 43 may notify the MME 44 that the terminal 40 has successfully connected to the target HeNB 42 by forwarding the S1AP path switch request message.

Meanwhile, when the target HeGW 43 transmits the S1AP path switch request message with trace activation information to the MME 44, the MME 44 may ignore the trace activation information. For example, since the MME 44 has already traced the terminal 40, it may not need to perform a separate operation according to the received trace activation information. Hence, the MME 44 may skip an operation corresponding to the received trace activation information.

At step S450, the target HeGW 43 may receive a S1AP path switch request acknowledge message from the MME 44.

At step S455, the target HeGW 43 may forward the S1AP path switch request acknowledge message received from the MME 44 to the target HeNB 42.

Thereafter, at step S460, the target HeNB 42 may send an X2AP UE context release message to the eNB 41. Here, the target HeNB 42 may notify the eNB 41 that X2 handover has been successfully completed by transmitting the X2AP UE context release message.

At step S465, the eNB 41 may release the connection with the terminal 40.

As described above, even when the terminal performs X2 handover from a macro base station (eNB) to a femto base station (HeNB) connected to a femto gateway (HeGW), as the target HeGW receives the trace activation information, it is possible to continuously trace the terminal.

Figure 5:
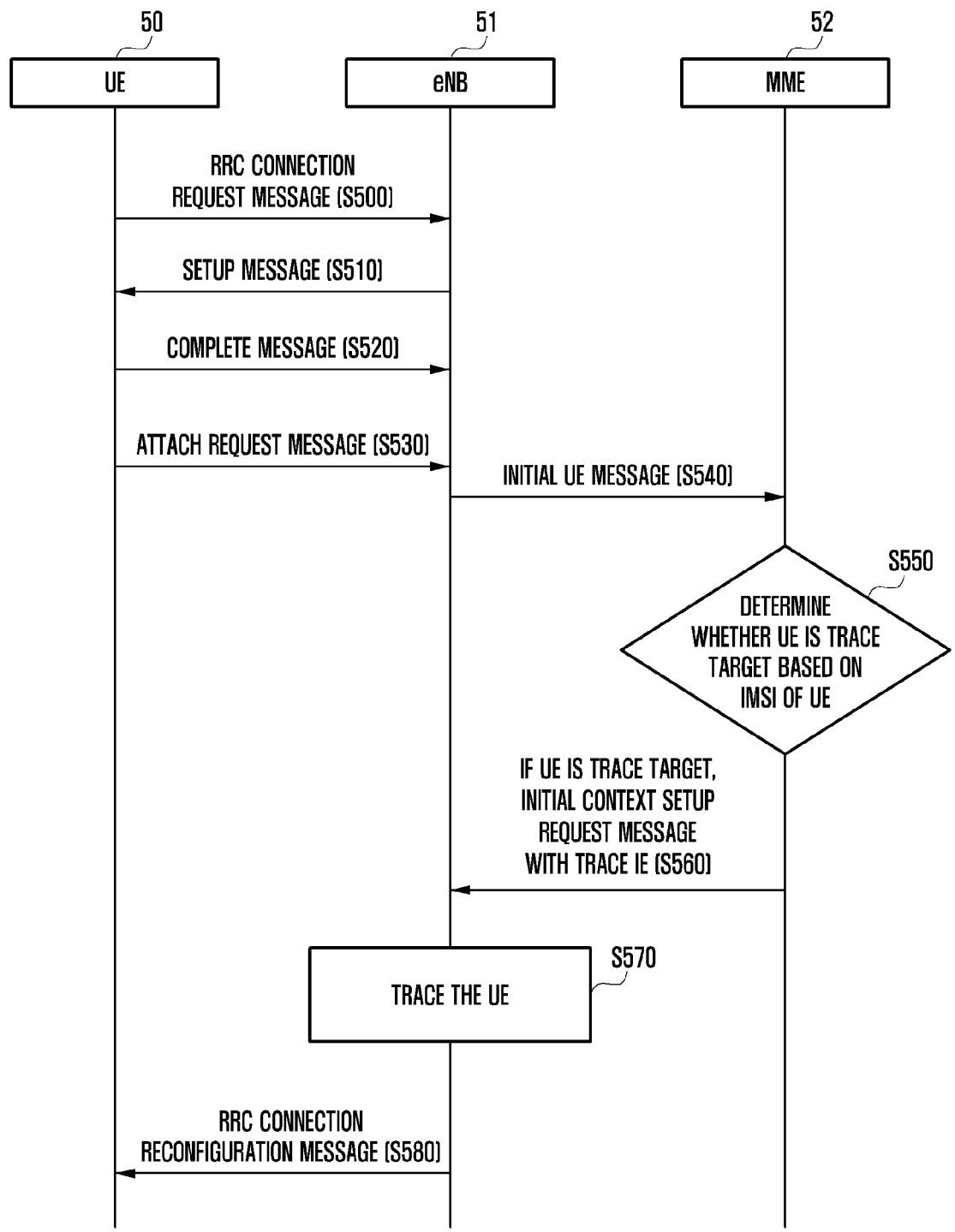
FIG. 5 is a sequence diagram illustrating a method of setting a terminal to be traced according to an embodiment of the present invention.

FIG. 5 is a sequence diagram illustrating a method of setting a terminal to be traced according to an embodiment of the present invention. Specifically, by use of the process shown in FIG. 5, the terminal can be traced as described before with reference to FIGS. 2 to 4.

First, the terminal (UE) 50 may connect to the base station (eNB) 51 and obtain radio resources. At step S500, the terminal 50 may transmit an RRC connection request message to the eNB 51.

At step S510, the terminal 50 may receive a setup message from the eNB 51 to configure basic settings. After connection setup with the eNB 51, at step S520, the terminal 50 may transmit a complete message to the eNB 51.

At step S530, the terminal 50 may transmit an attach request message to the eNB 51 to establish a connection with the MME 52.

Upon receiving the attach request message, at step S540, the eNB 51 may transmit an initial UE message to the MME 52. The initial UE message is a message transmitted through the NAS protocol, and may include the attach request message received from the terminal 50. In addition, the attach request message may include subscriber identification information of the terminal 50 such as IMSI.

Upon receiving the initial UE message, at step S550, the MME 52 may determine whether the terminal 50 is a trace target based on the IMSI of the terminal 50. Here, it is only an embodiment that the MME 52 determines whether the terminal 50 is a trace target based on the IMSI. The MME 52 may determine whether the terminal is a trace target based on subscriber identification information other than the IMSI.

Upon determining that the terminal 50 is a trace target, at step S560, the MME 52 may transmit an initial context setup request message including trace activation information to the eNB 51. For example, the trace activation information may be a trace activation IE or a trace IE.

At step S570, the eNB 51 may trace the terminal 50.

At step S580, the eNB 51 may transmit an RRC connection reconfiguration message to the terminal 50 to reconfigure the radio resources.

Upon receiving the RRC connection reconfiguration message, the terminal 50 can measure the strength of signals received from the serving cell and neighbor cells. When the indicated event occurs, the terminal 50 may report information on the measured signal strengths to the eNB 51. For example, the terminal 50 may report information on the measured signal strength on a periodic basis or when a specific condition set by the eNB 51 is satisfied.

As described before, the eNB 51 may determine to handover the terminal 50 to a different eNB based on the reported signal strength information.

Figure 6:
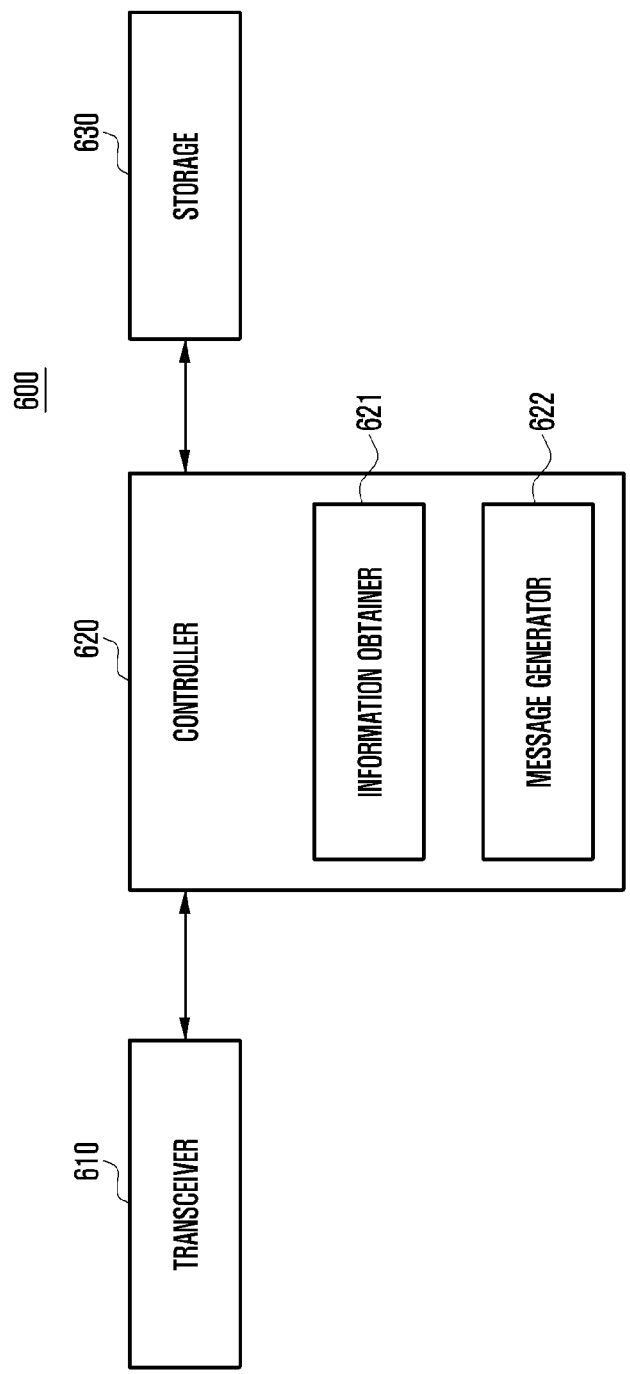
FIG. 6 is a block diagram of a femto base station according to an embodiment of the present invention.

FIG. 6 is a block diagram of a femto base station (HeNB) 600 according to an embodiment of the present invention. As shown in FIG. 6, the HeNB 600 may include a transceiver 610, a controller 620, and a storage 630.

The transceiver 610 is configured to transmit and receive a signal. For example, the HeNB 600 can use the transceiver 610 to transmit and receive signals to and from a terminal, a serving base station, or a femto gateway (HeNB gateway).

The controller 620 may control the overall operation of the HeNB 600. In one embodiment, the controller 620 may include an information obtainer 621 and a message generator 622.

When a signal is received from the serving base station through the transceiver 610, the information obtainer 621 can obtain trace activation information for a terminal from the received signal.

The serving base station transmitting a signal including trace activation information of a terminal may be a macro base station or a femto base station.

The message generator 622 may generate a message including the obtained trace activation information for a terminal. For example, the message including the obtained terminal trace activation information generated by the message generator 622 may be transmitted through the transceiver 610 to the femto gateway (HeNB gateway). Hence, the HeNB gateway may trace the indicated terminal.

The information obtainer 621 and the message generator 622 may be implemented as a separate hardware component in the controller 620. As another embodiment, the information obtainer 621 and the message generator 622 may be implemented as a software component or an application.

The controller 620 may not include a separate component such as the information obtainer 621 or the message generator 622. In this case, the controller 620 may directly perform an operation corresponding to the function of the information obtainer 621 or the message generator 622.

The controller 620 may control tracing the terminal according to the received trace activation information. For example, when trace activation information for a terminal is received by the transceiver 610, the controller 620 may collect information on all signals transmitted and received by the terminal and report the result of collection to the MME.

To transmit the terminal trace activation information, the controller 620 may control the transceiver 610 to transmit a S1AP path switch request message including the trace activation information to the femto gateway.

The trace activation information may be a trace activation IE.

The storage 630 may store various data and information. For example, the storage 630 may store the received trace activation information and the result of tracing a terminal under the control of the controller 620.

The HeNB 600 may communicate with the mobility management entity (MME) through the HeNB gateway.

The MME may receive a message including trace activation information for a terminal from the HeNB gateway. For example, the MME may receive a S1AP path switch request message including trace activation information. At this time, the MME may ignore the trace activation information. The MME may also skip an operation corresponding to the trace activation information. The trace activation information may be a trace activation IE.

Figure 7:
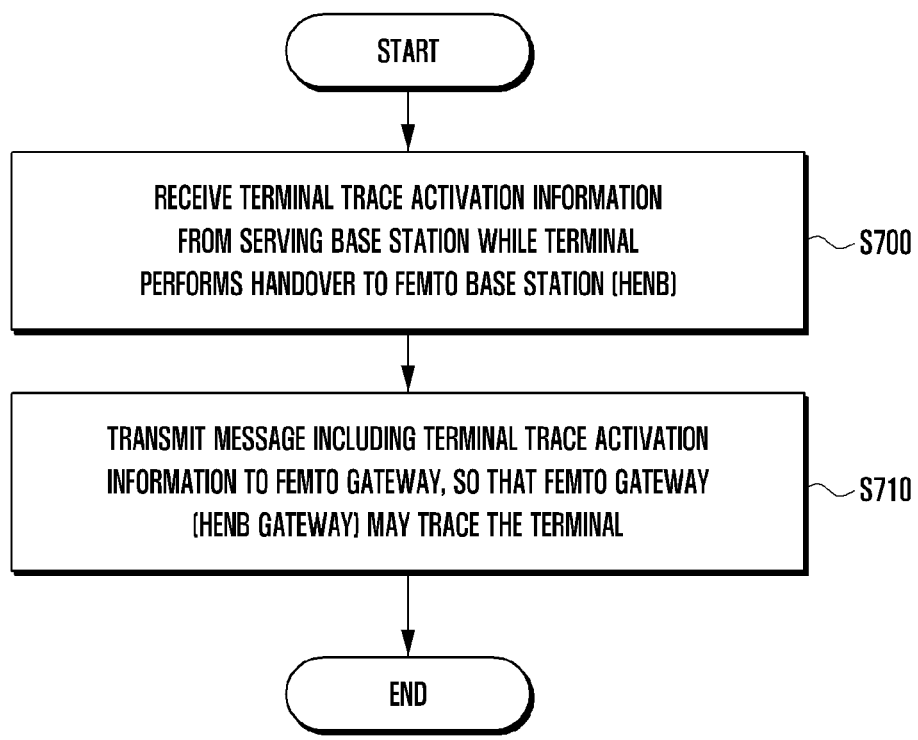
FIG. 7 is a flowchart for a control method of the femto base station according to an embodiment of the present invention.

FIG. 7 is a flowchart for a control method of the femto base station according to an embodiment of the present invention. At step S700, the femto base station may receive terminal trace activation information from the serving base station while the terminal performs handover to the femto base station.

At step S710, the femto base station may transmit a message including the received terminal trace activation information to the femto gateway, so that the femto gateway may trace the terminal.

As a consequence of the above described scheme, even when a terminal performs handover between base stations connected to different gateways, the target gateway connected with the target base station can trace the terminal.

Meanwhile, in various embodiments, the program code for implementing the base station and control method thereof described above may be stored in non-transitory computer readable media. A non-transitory readable medium is not a medium for storing data for a short time such as a register, cache or memory, but refers to a medium that semi-permanently stores data and can be read by a device or equipment. Specifically, various applications and programs described before may be stored in the non-transitory readable media, such as a CD, DVD, hard disk, Blu-ray disc, USB, memory card and ROM, for distribution.

Hereinabove, exemplary embodiments of the present invention have been described with reference to the accompanying drawings. However, the present invention is not limited to a specific embodiment described above. It should be understood that many variations and modifications of the basic inventive concept described herein will still fall within the spirit and scope of the present invention as defined in the appended claims and their equivalents.

The invention claimed is:

1. A control method performed by a femto base station (HeNB) connected to a mobility management entity (MME) via a femto gateway (HeNB gateway), the method comprising:
    receiving terminal trace activation information from a serving base station connected to the MME in case that a terminal performs a handover from the serving base station to the femto base station;
    performing a trace for the terminal based on the received terminal trace activation information; and
    transmitting a message including the received terminal trace activation information to the HeNB gateway connected to the MME for performing the trace for the terminal by the HeNB gateway.

2. The control method of claim 1, further comprising tracing the terminal based on the received terminal trace activation information.

3. The control method of claim 1, wherein the transmitting the message comprises transmitting a S1AP path switch request message including the terminal trace activation information to the femto gateway.

4. The control method of claim 1, wherein the serving base station comprises a macro base station (macro eNB) or the femto base station (HeNB).

5. The control method of claim 1, wherein the terminal trace activation information is a trace activation IE.

6. A femto base station (HeNB) connected to a mobility management entity (MME) via a femto gateway (HeNB gateway), the HeNB comprising:
    a transceiver configured to transmit and receive a signal; and
    a controller configured to control the transceiver to receive terminal trace activation information from a serving base station connected to the MME in case that a terminal performs a handover from the serving base station to the femto base station,
    perform a trace for the terminal based on the received terminal trace activation information, and
    control the transceiver to transmit a message including the received terminal trace activation information to the HeNB gateway connected to the MME for performing the trace for the terminal by the HeNB gateway.

7. The femto base station of claim 6, wherein the controller is configured to trace the terminal based on the received terminal trace activation information.

8. The femto base station of claim 6, wherein the controller is configured to control the transceiver to transmit a S1AP path switch request message including the terminal trace activation information to the femto gateway.

9. The femto base station of claim 6, wherein the serving base station is a macro base station (macro eNB) or the femto base station (HeNB), and wherein the terminal trace activation information is a trace activation IE.

* * * * *